(12) United States Patent
Huizing

(10) Patent No.: US 9,213,095 B2
(45) Date of Patent: Dec. 15, 2015

(54) COMBINED DIRECTION FINDER AND RADAR SYSTEM, METHOD AND COMPUTER PROGRAM PRODUCT

(75) Inventor: Albert Gezinus Huizing, Voorschoten (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 570 days.

(21) Appl. No.: 13/126,995

(22) PCT Filed: Oct. 30, 2009

(86) PCT No.: PCT/NL2009/050659
§ 371 (c)(1),
(2), (4) Date: Sep. 8, 2011

(87) PCT Pub. No.: WO2010/050816
PCT Pub. Date: May 6, 2010

(65) Prior Publication Data
US 2011/0309981 A1 Dec. 22, 2011

(30) Foreign Application Priority Data
Oct. 30, 2008 (EP) .................................... 08167955

(51) Int. Cl.
*G01S 13/34* (2006.01)
*G01S 13/86* (2006.01)
(Continued)

(52) U.S. Cl.
CPC . *G01S 13/86* (2013.01); *G01S 3/48* (2013.01); *G01S 3/74* (2013.01); *G01S 7/021* (2013.01); *G01S 13/34* (2013.01); *G01S 2013/0254* (2013.01); *G01S 2013/0272* (2013.01)

(58) Field of Classification Search
CPC ........... G01S 13/86; G01S 3/74; G01S 13/34; G01S 3/48; G01S 7/021; G01S 2013/0272; G01S 2013/0254
USPC .......................................................... 342/56
See application file for complete search history.

(56) References Cited

U.S. PATENT DOCUMENTS 2,551,589 A * 5/1951 Everhart .......................... 342/56
2,927,316 A * 3/1960 Granqvist ........................ 342/56
(Continued)

FOREIGN PATENT DOCUMENTS

| EP | 1 233 282 A1 | 8/2002 |
|---|---|---|
| GB | 2 155 721 A | 9/1985 |
| GB | 2 429 860 A | 3/2007 |
| JP | 2001-264420 A | 9/2001 |
| JP | 2003-066133 A | 3/2003 |

OTHER PUBLICATIONS

Graham et al. "The Dual Linear Array a Rapid Evolution for Low Cost Phased Arrays." RADAR 2002. Oct. 15-17, 2002. pp. 99-103.*
(Continued)

*Primary Examiner* — Matthew M Barker
(74) *Attorney, Agent, or Firm* — Novak Druce Connolly Bove + Quigg LLP

(57) ABSTRACT

A system for determining a propagation direction of a received electromagnetic wave includes a linear phased array of receiving antenna elements and a processing unit for processing signals received by the receiving antenna elements. The processor is arranged for generating, from the received signals, receiving data corresponding to a set of respective angular synthetic receiving aperture beams.

11 Claims, 11 Drawing Sheets

(51) Int. Cl.
*G01S 3/48* (2006.01)
*G01S 3/74* (2006.01)
*G01S 7/02* (2006.01)
*G01S 13/02* (2006.01)

(56) References Cited

U.S. PATENT DOCUMENTS

| | | | |
|---|---|---|---|
| 4,301,454 A | 11/1981 | Bailey | |
| 4,700,191 A | 10/1987 | Manor | |
| 4,983,983 A * | 1/1991 | Huntley et al. | 342/443 |
| 5,087,922 A * | 2/1992 | Tang et al. | 343/814 |
| 5,175,559 A | 12/1992 | Schrank et al. | |
| 5,317,319 A | 5/1994 | Fagarasan et al. | |
| 5,355,141 A | 10/1994 | Graham et al. | |
| 5,361,072 A | 11/1994 | Barrick et al. | |
| 5,613,039 A * | 3/1997 | Wang et al. | 706/24 |
| 5,977,918 A * | 11/1999 | Sirmalis | 343/709 |
| 6,232,920 B1 * | 5/2001 | Brookner et al. | 342/372 |
| 6,377,213 B1 | 4/2002 | Odachi et al. | |
| 6,545,632 B1 * | 4/2003 | Lyons et al. | 342/45 |
| 7,071,872 B2 * | 7/2006 | Guy | 342/371 |
| 7,626,538 B2 * | 12/2009 | Rose | 342/195 |
| 2003/0184472 A1 | 10/2003 | Krikorian et al. | |
| 2004/0061639 A1 | 4/2004 | Voigtlaender et al. | |
| 2006/0227050 A1 | 10/2006 | Vaughn, Jr. | |

OTHER PUBLICATIONS van Dijk et al., "Multi-Mode FMCW Radar Array with Independent Digital Beam Steering for Transmit and Receive." Radar Conference, EuRAD 2008, pp. 412-415 (2008).

Tavik et al., "The Advanced Multifunction RF Concept." IEEE Transaction on Microwave Theory and Techniques, vol. 53, No. 3, pp. 1009-1020 (Mar. 2005).

Hughes II et al., "Advanced Multifunction RF Systems (AMRFS)." NRL Featured Research, pp. 37-48 (date unknown).

Stove et al., "Low Probability of Intercept Radar Strategies." IEE Proc. Radar Sonar Navig., vol. 151, No. 5, pp. 249-260 (Oct. 2004).

Collins et al., "A Review of Current and Future Components for Electronic Warfare Receivers." IEEE Transactions on Microwave Theory and Techniques, vol. MTT-29, No. 5, pp. 395-403 (May 1981).

Anderson et al., "Advanced Channelization Technology for RF, Microwave, and Millimeterwave Applications." Proceedings of the IEEE, vol. 79, No. 3, pp. 355-388 (Mar. 1991).

Lievers et al., "Digital Beam Forming on Transmit and Receive with an AESA FMCW Radar." Proceedings of 4th European Radar Conference 2007, pp. 47-50 (2007).

Schrick et al., "Interception of LPI Radar Signals." IEEE International Radar Conference, pp. 108-111 (1990).

Stove, A.G., "Radar and ESM: The Current State of the LPI Battle." 1st EMRS DTC Technical Conference—Edinburgh 2004, A14 (2004).

Hopwood et al., "Digital Beam Forming for Tactical Airborne Radars," Digital Avionics Systems Conference, IEEE, vol. 0.1-1-0. 1-7 (1997).

Lievers et al., "Digital beam forming on transmit and receive with an AESA FMCW radar," Proceedings of the 4th European Radar Conference, IEEE, pp. 47-50 (2007).

International Search Report for PCT/NL2009/050659, mailed Sep. 6, 2010.

* cited by examiner

COMBINED DIRECTION FINDER AND RADAR SYSTEM, METHOD AND COMPUTER PROGRAM PRODUCT

CROSS-REFERENCE TO RELATED APPLICATIONS

This application is filed under 35 U.S.C. 371 as a U.S. national phase application of PCT/NL2009/050659, having an international filing date of 30 Oct. 2009, which claims the benefit of European Patent Application No. 08167955.7, having a filing date of 30 Oct. 2008, both of which are hereby incorporated by reference.

TECHNICAL FIELD

The invention relates to a system for determining a propagation direction of a received electromagnetic (EM) wave.

BACKGROUND

In the field of localizing EM sources, such as radar transmitting antennas or wireless communications systems, systems are known that are arranged for determining a propagation direction of a propagating electromagnetic wave, e.g. for surface surveillance applications. Such known systems include receiving antenna configurations wherein an antenna element can be pivoted so as to find an optimal receipt angular position indicating an electromagnetic wave propagating direction. Another known system comprises a multiple number of antenna elements that are arranged in a circle, wherein direction information is determined based on amplitude and/or phase differential measurements. Both systems, however, suffer from inaccuracy in determining the propagation direction of a received electromagnetic wave.

U.S. Pat. No. 6,377,213 discloses an antenna apparatus having a wave arrival direction estimating apparatus, comprising a plurality receiving antenna elements coupled together by a corresponding variable phase shifter. Adjusting the variable phase shifters changes the effective (receiving) directivity of the apparatus.

SUMMARY

With this in mind, according to a first aspect, the present invention may provide a system for determining a propagation direction of a received electromagnetic wave, the system comprising:
a first linear phased array of transmitting antenna elements;
a second linear phased array of receiving antenna elements;
a processing unit for processing signals received by the receiving antenna elements to generate receiving data corresponding to a set of respective angular synthetic receiving aperture beams;
wherein the first and second linear phased arrays are configurable to enable the system to operate in a radar mode, an ESM mode, or a combined radar/ESM mode, and wherein the system further comprises a multiple number of conditioning paths, each path including an amplifier, a bandpass filter and an ADC for conditioning signals received from a corresponding receiving antenna element.

The system is able to operate in a radar mode, in a propagation direction finding or ESM mode or in a combined radar/ESM mode wherein both a radar operation as well as a propagation direction finding operation is performed. The thus obtained system can be implemented in a compact way while providing various electromagnetic functions, viz. for detecting passive objects by radar and for detecting active objects i.e. objects transmitting electromagnetic fields. By integrating both functions in a single system a system volume and/or weight reduction can be obtained, thus rendering the system flexible and appropriate for use at a relatively small platform.

In a preferred embodiment, that operates in a said combined radar/ESM mode, the first array is configured to transmit a radar signal in a beam having a relatively narrow angular width, and the second array is configured to receive, at a first receiving antenna element, in a relatively broad beam a reflected radar signal, and to determine, at the other receiving antenna elements, the propagation direction of a received electromagnetic wave.

In an advantageous embodiment according to the invention, the system comprises a multiple number of linear phased arrays of receiving antenna elements, the phased arrays having a mutually different orientation, thereby enlarging the range of propagation directions that can be scanned by the system. As an example, the linear phased arrays are oriented mutually substantially transversely or along sides of a polygon facing an omnidirectional view.

According to a second aspect, the present invention may also provide a method of determining a propagation direction of a received electromagnetic wave using a hardware platform comprising a first linear phased array of transmitting antenna elements and a second linear phased array of receiving antenna elements, comprising:
transmitting a radar signal in a beam having a relatively narrow angular width;
arranging a first receiving element of said second linear phased array to receive a reflected radar signal; and
arranging further receiving antenna elements of said second linear phased array to determine a propagation direction of a received electromagnetic wave, wherein the method further comprises a step of conditioning, in multiple number of conditioning paths, signals received from receiving antenna elements, by amplifying, bandpass filtering, and analogue-digital converting signals received from a corresponding receiving antenna element.

Further, the invention relates to a computer program product.

According to a third aspect, the present invention may also provide a system for determining a propagation direction of a received electromagnetic wave, the system comprising:
a linear phased array of receiving antenna elements, and
a processing unit for processing signals received by the receiving antenna elements,
wherein the processor is arranged for generating, from the received signals, receiving data corresponding to a set of respective angular synthetic receiving aperture beams.

According to a fourth aspect, the present invention may provide a method of determining a propagation direction of a received electromagnetic wave, comprising the steps of:
receiving signals of a propagating electromagnetic wave by a linear phased array of receiving antenna elements, and
generating, from the received signals, receiving data corresponding to a set of respective angular synthetic receiving aperture beams.

According to a fifth aspect, the present invention may provide a computer program product comprising computer readable code for causing a processor to perform the method according to the fourth aspect.

Other advantageous embodiments according to the invention are described in the following claims.

BRIEF DESCRIPTION OF THE DRAWINGS

Exemplary embodiments of the present invention are now described with reference to the accompanying drawings, in which.

It is noted that the figures shows merely preferred embodiments according to the invention. In the figures, the same reference numbers refer to equal or corresponding parts.

DETAILED DESCRIPTION

Figure 1:
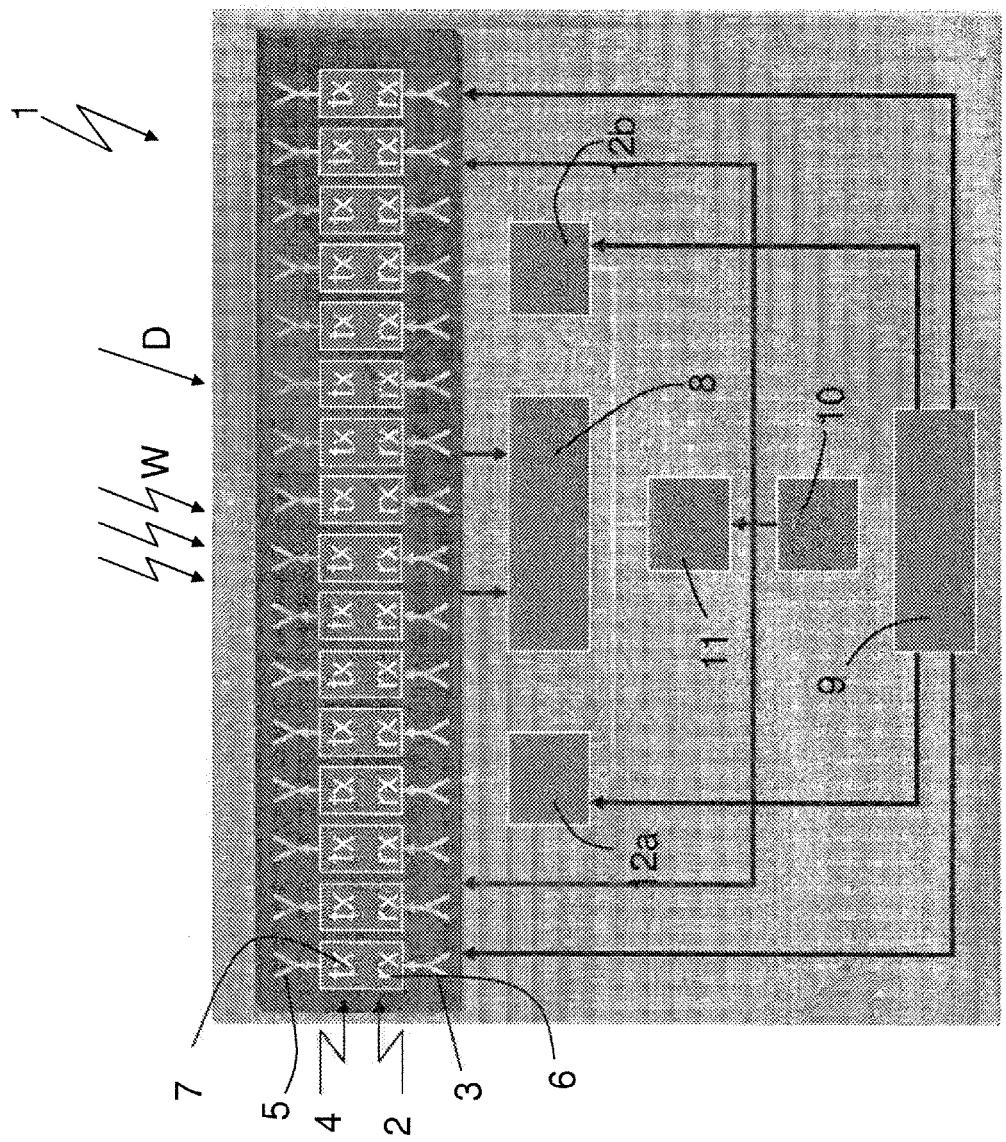
FIG. 1 shows a first block scheme of a first embodiment of a system according to the invention for determining a propagation direction of a received electromagnetic wave.

FIG. 1 shows a first block scheme of a system 1 according to the invention for determining a propagation direction D of a received electromagnetic wave W. The system 1 comprises a linear phased array 2 of receiving antenna elements 3 for receiving an incoming electromagnetic field. Further, the system 1 comprises a linear phased array 4 of transmitting antenna elements 5 for transmitting a radar field. Each receiving antenna element 3 and each transmitting antenna element 5 is connected to a separate receiver 6 and transmitter 7, respectively, so that the antenna elements 3, 5 can operate separately. In the shown embodiment, the total number of transmitting antenna elements 5 is sixteen, while the total number of receiving antenna elements 3 is also sixteen. Further, the system 1 comprises a processor 8 for processing signals. Also, the system 1 comprises a system control unit 9 for controlling the system 1, a clock 10 and a local oscillator 11 for generating a signal to be transmitted and/or to be mixed with a received signal by a mixer 12a, 12b included in the system 1.

Figure 2:
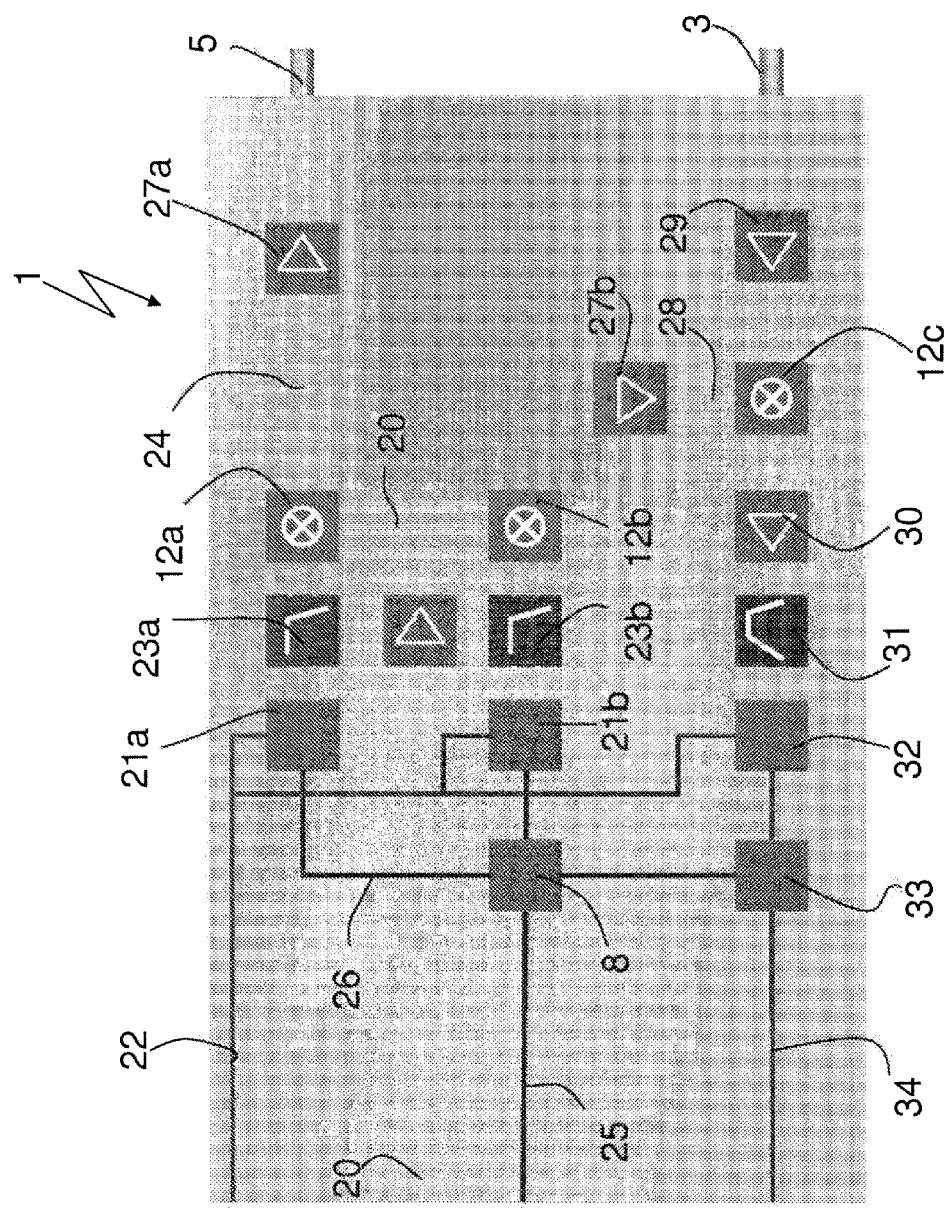
FIG. 2 shows a second block scheme of the system shown in FIG. 1.

FIG. 2 shows a second block scheme of the system 1 described in relation with FIG. 1 on a signal level. Here, a local oscillator signal 20 is conditioned by an amplifier 21 and input to a first mixer 12a for mixing with a baseband sweep generated by a direct digital synthesizer 21 included in the system 1. The direct digital synthesizer 21a is fed by a clock signal 22 and a control signal 26 generated by the processor 8. The processor 8 is controlled by a control signal 25 generated by the system control unit 9. Before mixing the baseband sweep signal, a low pass filtering step is applied by a low pass filter 23a included in the system 1. The mixed signal 24 is fed to an amplifier 27a included in the system 1. Then, the amplified signal is transmitting via a transmitting antenna element 5. In a similar way, a similar transmission signal 28 is generated using a separate path of the system 1 including a separate direct digital synthesizer 21b, a separate low pass filter 23b, a separate mixer 12b and a separate amplifier 27b.

Upon receipt of an electromagnetic signal in a receiving antenna element 7, the signal is conditioned by an amplifier 29, mixed via a third mixer 12c with the transmission signal 28 generated in the separate processing path of the system 1, further conditioned by a further amplifier 30, a band pass filter 31 and an analog-to-digital converter (ADC) 32 included in the system 1. The thus obtained digital signal is further processed by a digital-to-digital converter 33 that is controlled by the processor 8. As a result, a digital signal 34 is generated for further processing.

The architecture of the system 1 is arranged such as to perform a radar operation wherein the transmitted frequency sweep signal is mixed with the received signal to obtain passive object information generating the reflected signal upon incidence of the signal transmitted by the system 1. It is noted that FIGS. 1 and 2 shows a specific component implementation of the system 1 according to the invention. Obviously, other or further components can be used. As an example, further spectral filtering can be applied.

The transmitted radar signals have preferably a frequency modulated continuous waveform, more preferably a linear frequency modulated continuous waveform, thereby providing a low probability of intercept radar system that can be implemented in a relatively simple architecture using relatively low cost components. Since the signal reflected by the passive object is received after a delay depending on the distance between the system 1 and the object, the frequency difference between the transmitted signal and the received signal, also called the beat frequency, at a particular moment is a measure for said distance. The beat frequency is obtained by mixing the receiving signal with the transmitted signal. In principle, also other information can be retrieved from the received signal, such as velocity information of the passive object. This might be accomplished by measuring a Doppler effect. It is further noted that instead of applying a frequency modulated continuous waveform, also other radar signals can be used, such as pulsed signals.

Figure 3:
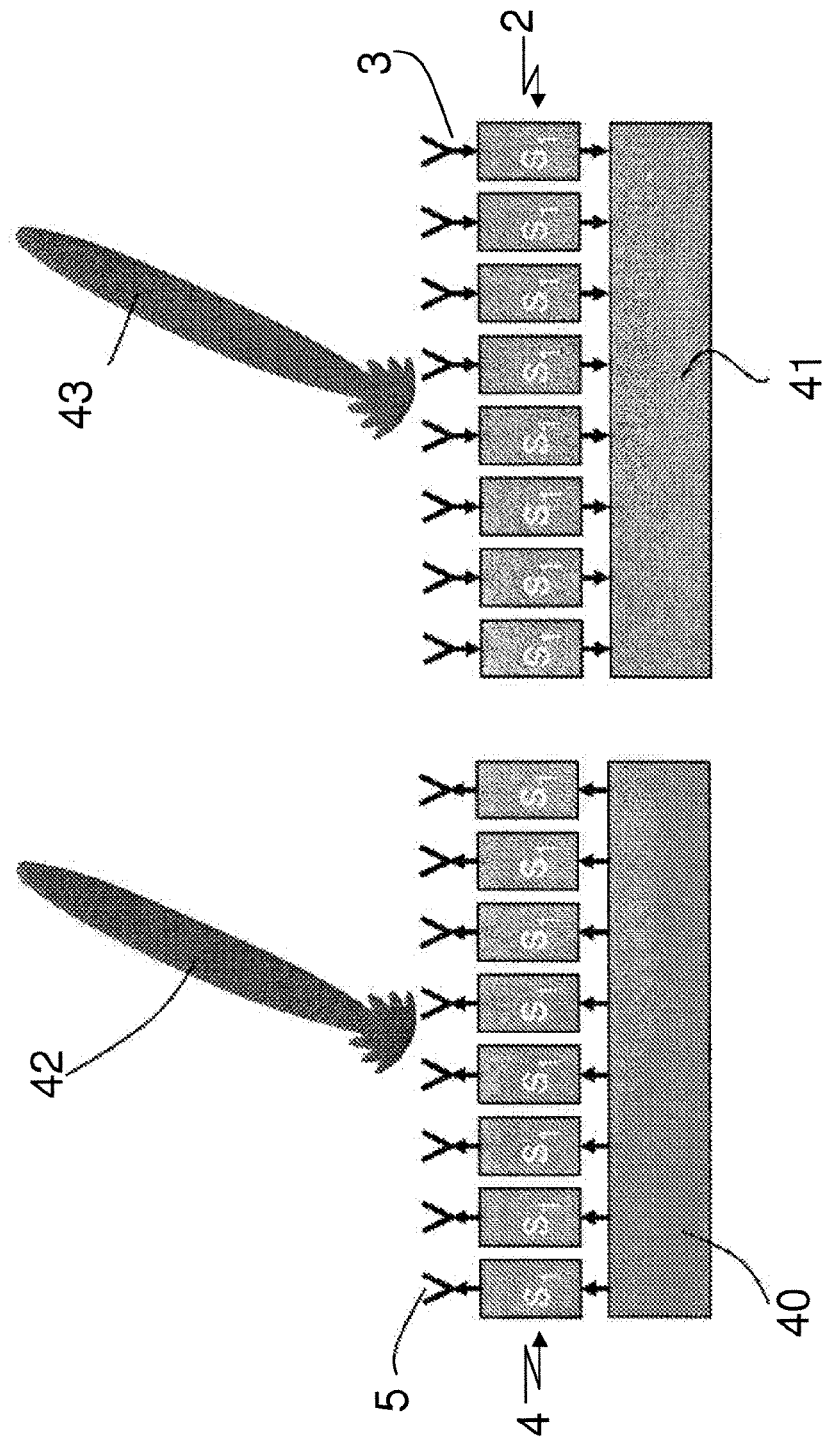
FIG. 3 shows a block scheme of a second embodiment of a system according to the invention for determining a propagation direction of a received electromagnetic wave, in a first radar mode.

FIG. 3 shows a block scheme of another embodiment of a system 1 according to the invention, when operating in a first radar mode. The system 1 is now provided with eight transmitting antenna elements 5 and eight receiving antenna elements 3. The system 1 comprises a transmission control unit 40 for controlling operation of the transmitting antenna elements 5. Further, the system 1 comprises a receiving control unit 41 for controlling operation of the receiving antenna elements 3. In the first radar mode, the radar signals are transmitted by the linear phased array 4 of transmitting antenna elements 5 in a beam 42 having a relatively narrow width. Such a beam 42 can be generated by adjusting the phase of the specific antenna element signals to be transmitted by the linear phased array 4. Also the orientation of the narrow beam 42 can be set by controlling the phase of the individual signals to be transmitted. During operation in said first radar mode, the processor 8 generates, from the individual received radar signals, receiving data corresponding to an angular synthetic receiving aperture beam 43 wherein the orientation of the synthetic receiving aperture beam substantially coincides with the orientation of the narrow beam orientation of the transmitted signals, thereby efficiently providing radar information in the narrow beam direction. The received data can be generated by specifically collecting phase information of the received signals from the individual receiving antenna elements 3. By adjusting the orientation of the transmission narrow beam 42 and the corresponding synthetic receiving aperture beam 43, a range of angular positions can be scanned.

Figure 4:
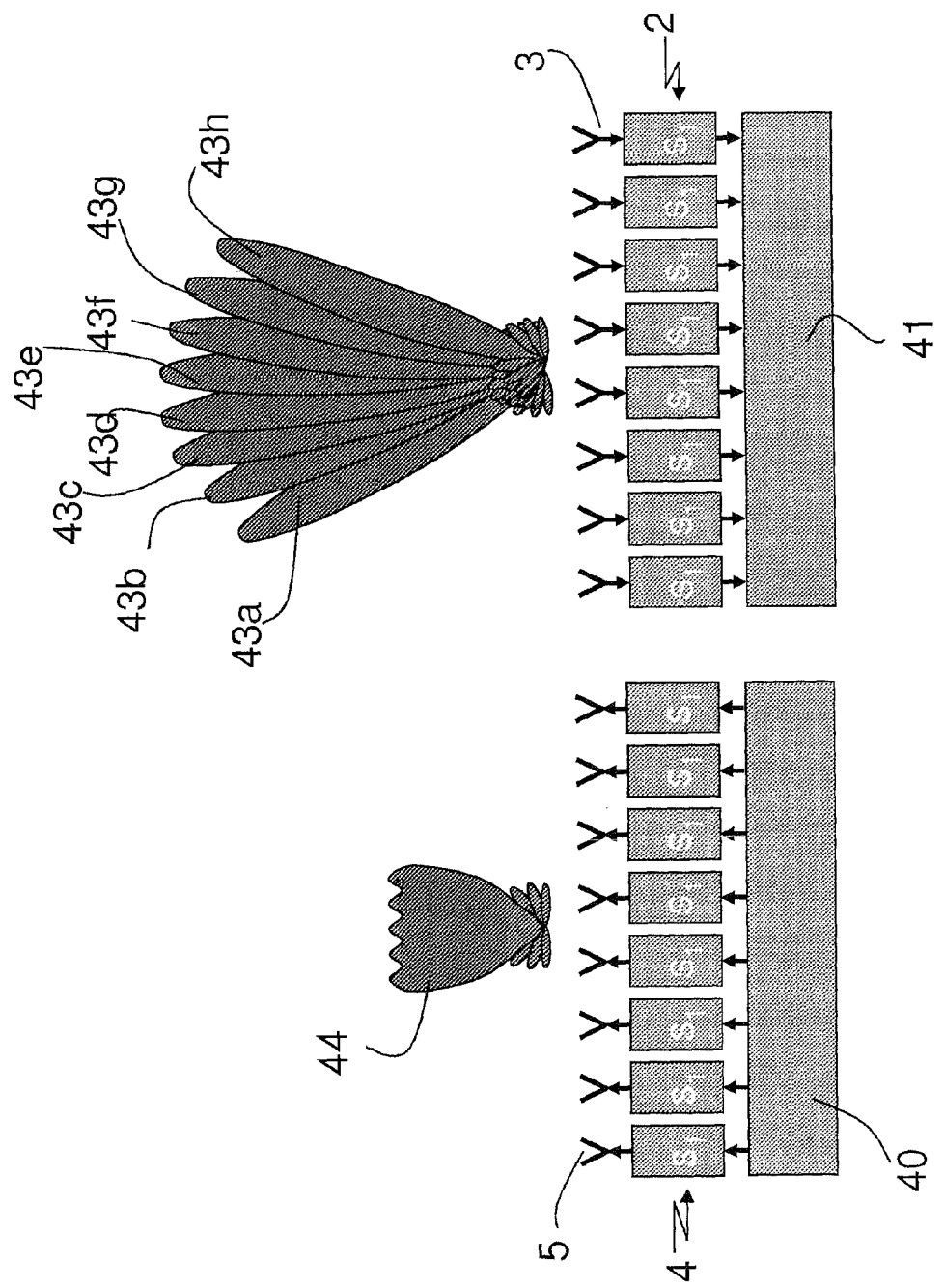
FIG. 4 shows a block scheme of the system of FIG. 3 in a second radar mode.

FIG. 4 shows a block scheme of the system 1 when operating in a second radar mode. Here, radar signals are transmitted in a beam 44 having a relatively broad width. Now, the processor 8 generates receiving data to a set of angular synthetic receiving aperture beams 43a-h to scan cover a range of angular positions. Again, particular receiving data in a specific synthetic receiving aperture beam 43c can be generated by specifically collecting phase information of the received signals from the individual receiving antenna elements 3.

Figure 5:
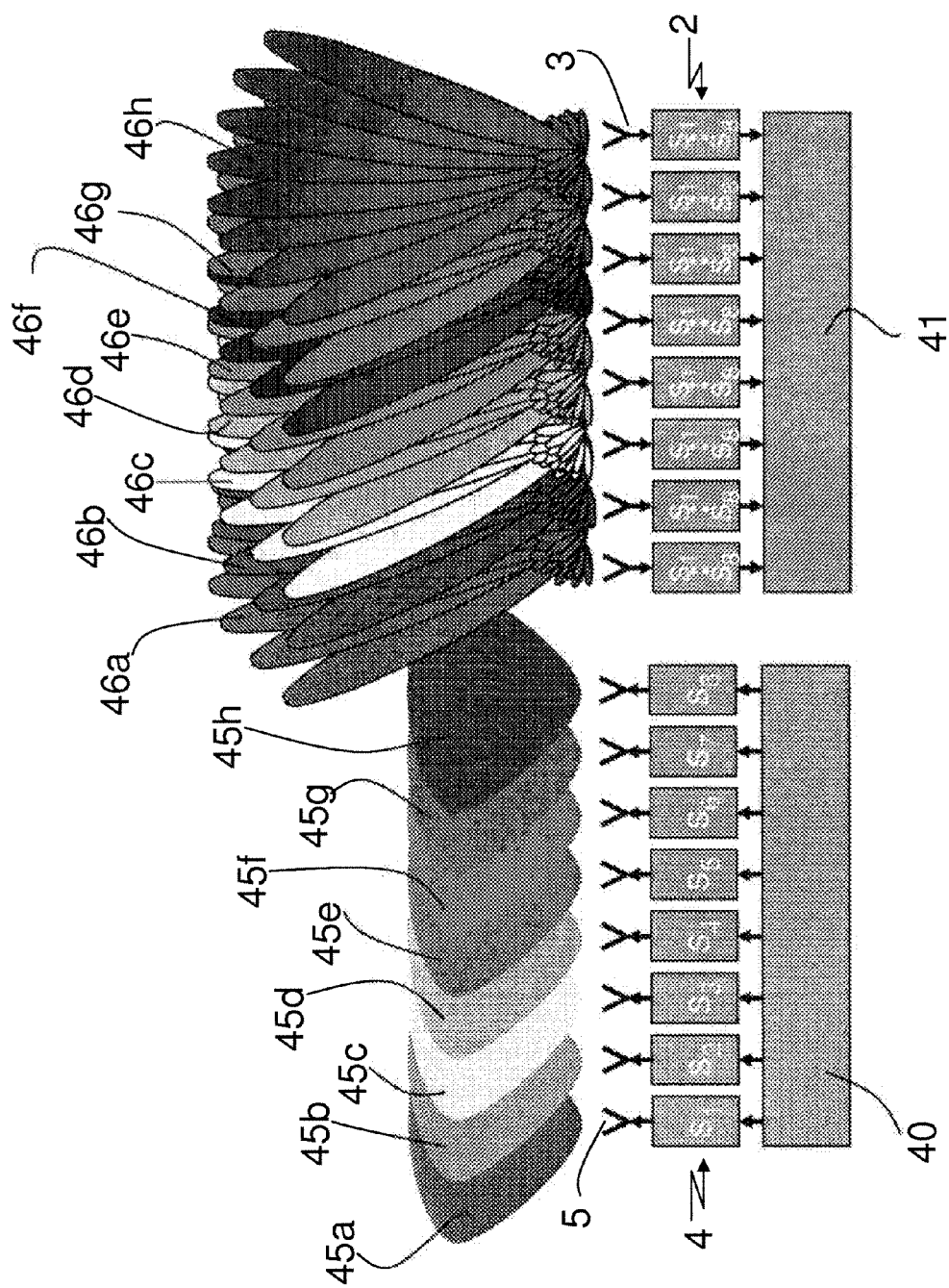
FIG. 5 shows a block scheme of the system of FIG. 3 in a third radar mode.

FIG. 5 shows a block scheme of the system 1 when operating in a third radar mode. Here, multiple frequency sweep transmission signals are generated, so that, at a particular time instant, the transmitted signal comprises multiple frequency components. Preferably, the individual frequency sweep components are mutually orthogonal. By using multiple frequency sweep transmission signals the radar resolution improves. At the receivers, similarly, multiple frequency sweep receiving signals are received. In FIG. 5, the multiple frequency sweep feature is symbolically denoted by a series of transmission beams 45a-h and a series of multiple angular synthetic receiving aperture beams 46a-h.

Figure 6:
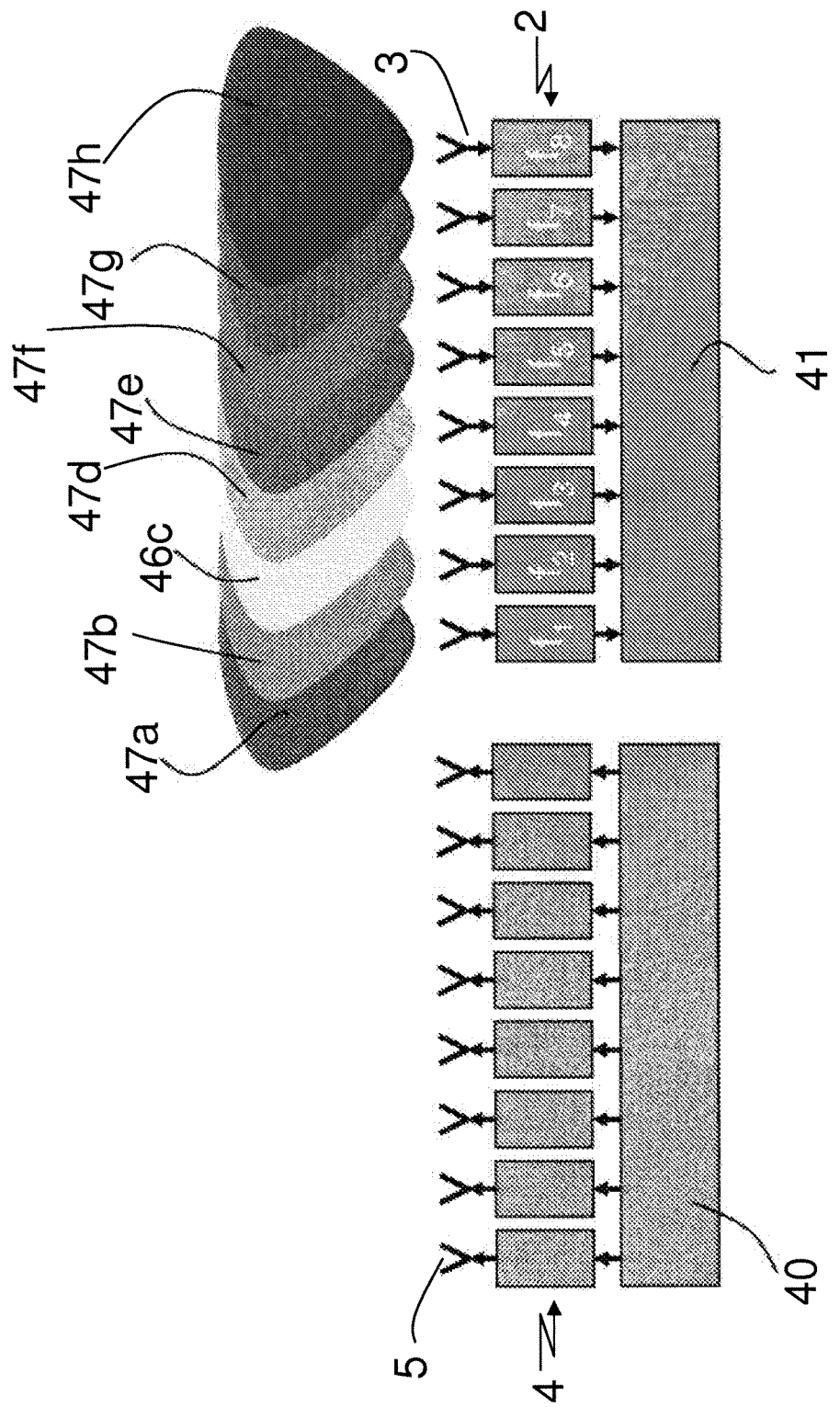
FIG. 6 shows a block scheme of the system of FIG. 3 in a first electronic warfare support measures (ESM) mode.

FIG. 6 shows a block scheme of the system 1 in a first mode of determining a propagation direction of a received electromagnetic wave, also called electronic warfare support measures (ESM) if the system is applied in the field of military surveillance. The linear phased array 4 of transmitting antenna elements is not in operation. However, the linear phased array 2 of receiving antenna elements is in an active state for receiving incoming electromagnetic waves in broad beams 47a-h. The processor is arranged for generating, from signals received via the receiving antenna elements 3, receiving data corresponding to a set of respective angular synthetic receiving aperture beams. The generation of the receiving data is performed in two steps, a first step corresponding with the first ESM mode. Here, the individual receiving antenna elements 3 have each been assigned to corresponding mutually different frequency bands. As such, a first receiving antenna element is assigned to a first frequency band, a second receiving antenna element is assigned to a further, second frequency band, different from the first frequency band, etc. Therefore, a band pass filter can be applied to the received signals. Then, the processor 8 determines whether a signal of the receiving antenna elements 3 comprises information of a received electromagnetic wave. If that is the case, an active object transmitting electromagnetic waves has been detected.

Figure 7:
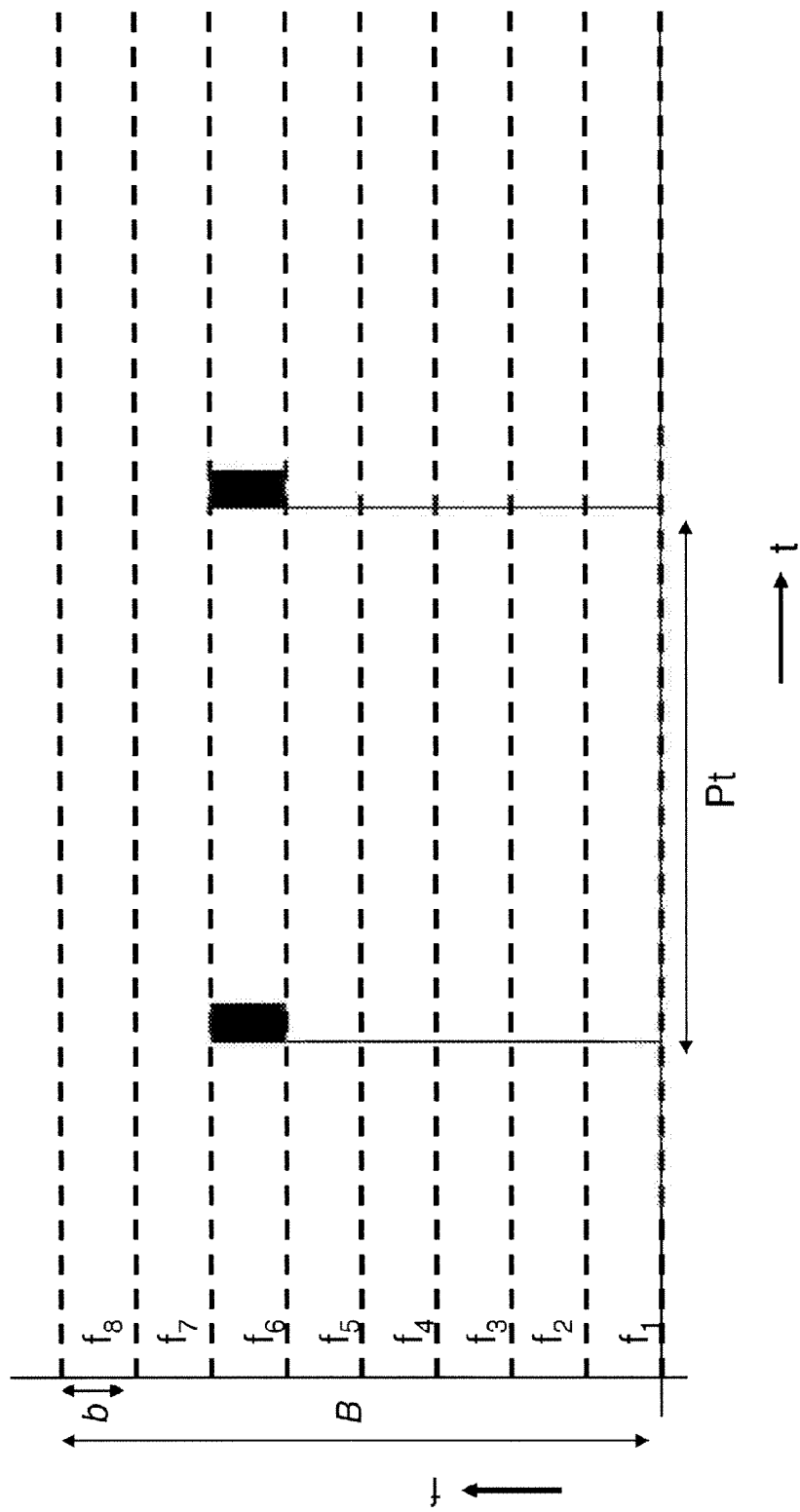
FIG. 7 shows a first frequency diagram.

FIG. 7 shows a first frequency diagram wherein any occurrence of signals at a frequency f is set out as a function of time t. A total frequency band B is divided in eight subbands $f_1$-$f_8$, each subband having a subband bandwidth b. Each of the eight subbands $f_1$-$f_8$ is assigned to a corresponding receiving antenna element 3. In FIG. 7 a radar pulse signal originating from an external active source is present in the sixth subband $f_6$, occurring at pulse repetition times Pt.

Figure 8:
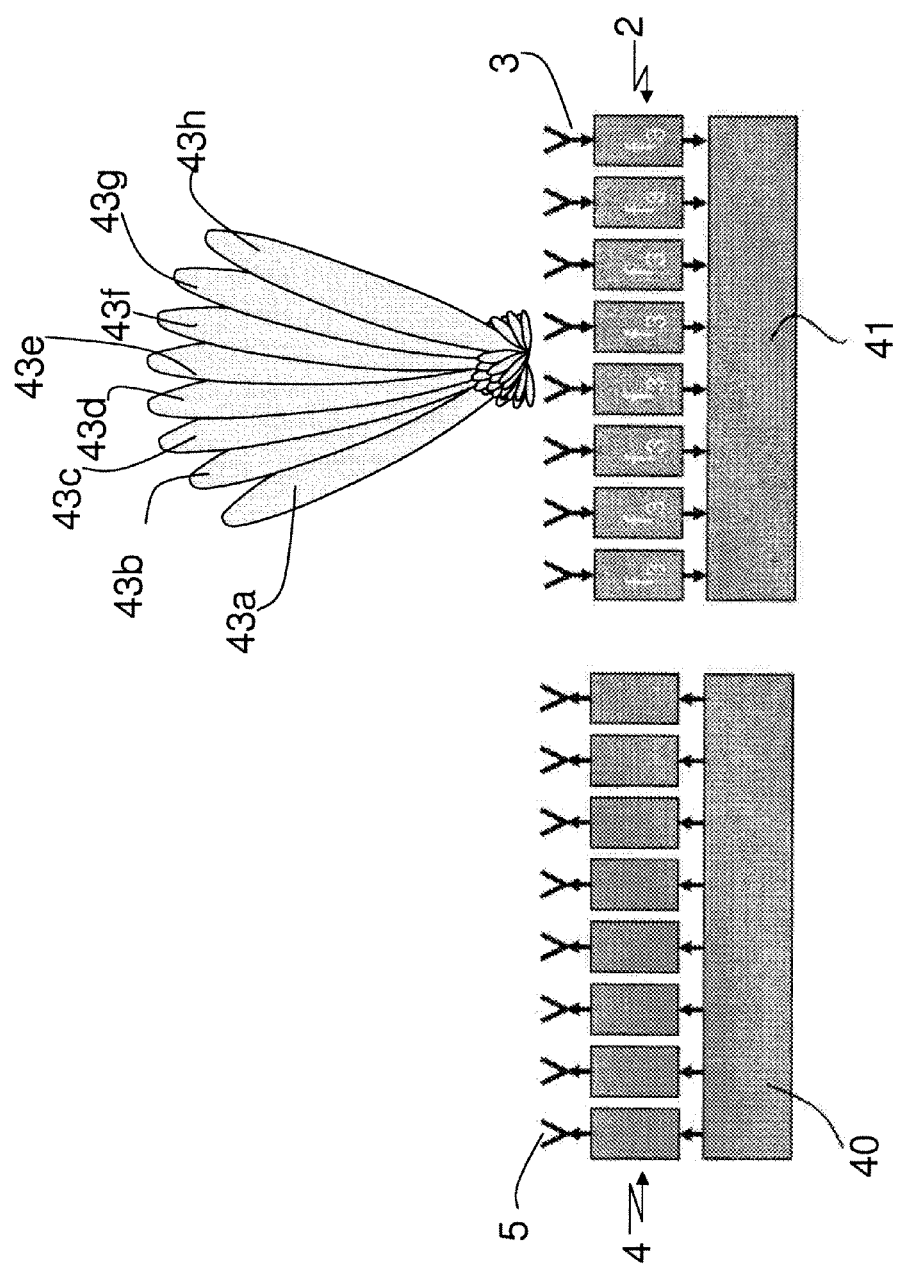
FIG. 8 shows a block scheme of the system of FIG. 3 in a second radar mode.

In order to obtain directional information of the detected active object, the system is brought in a second ESM mode, shown in FIG. 8.

The individual receiving antenna elements 3 have been tuned to a specific frequency band that corresponds to the frequency band that has been assigned to the receiving antenna element providing the signal comprising the received electromagnetic wave signal, in the example described above the frequency band $f_6$. Then, the processor 8 generates, from signals received via the receiving antenna elements 3, receiving data corresponding to a set of respective angular synthetic receiving aperture beams 43a-h. Similar to the strategy as described in relation with a radar mode of the system, the received data can be generated by specifically collecting phase information of the received signals from the individual receiving antenna elements 3. As a result, the direction of the active source emitting radar pulses can be determined.

Thus, in searching an active radar source transmitting radar pulses, a two step approached can be applied, a first step comprising finding frequency information of the pulses and a second step comprising finding angular information of the travelling pulses. Obviously, also another strategy can be applied, e.g. operating the system in the second ESM mode while subsequently scanning a multiple number of frequency subbands.

Further, the second ESM mode can also be applied in searching an active radar source transmitting frequency modulated continuous waveforms.

Figure 9:
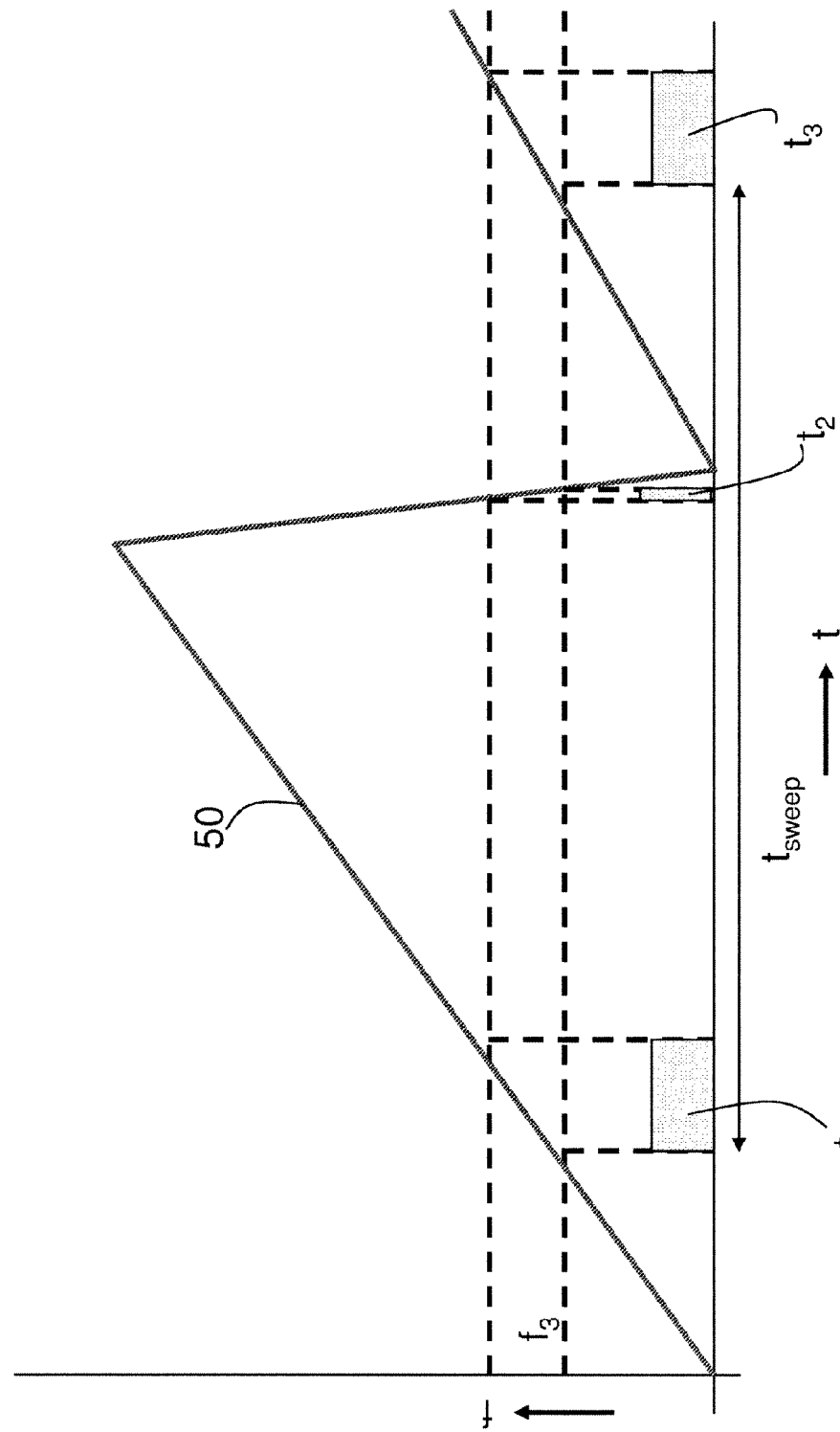
FIG. 9 shows a second frequency diagram.

FIG. 9 shows a second frequency diagram wherein a linear frequency modulated continuous waveform 50 is intercepted at specific time instants $t_1$, $t_2$, $t_3$ when the individual receiving antenna elements 3 have been tuned to a specific frequency band $f_3$. From the interception data, specific parameters of the frequency modulated continuous waveform 50 can be retrieved, such as a sweep repetition time $t_{sweep}$.

Figure 10:
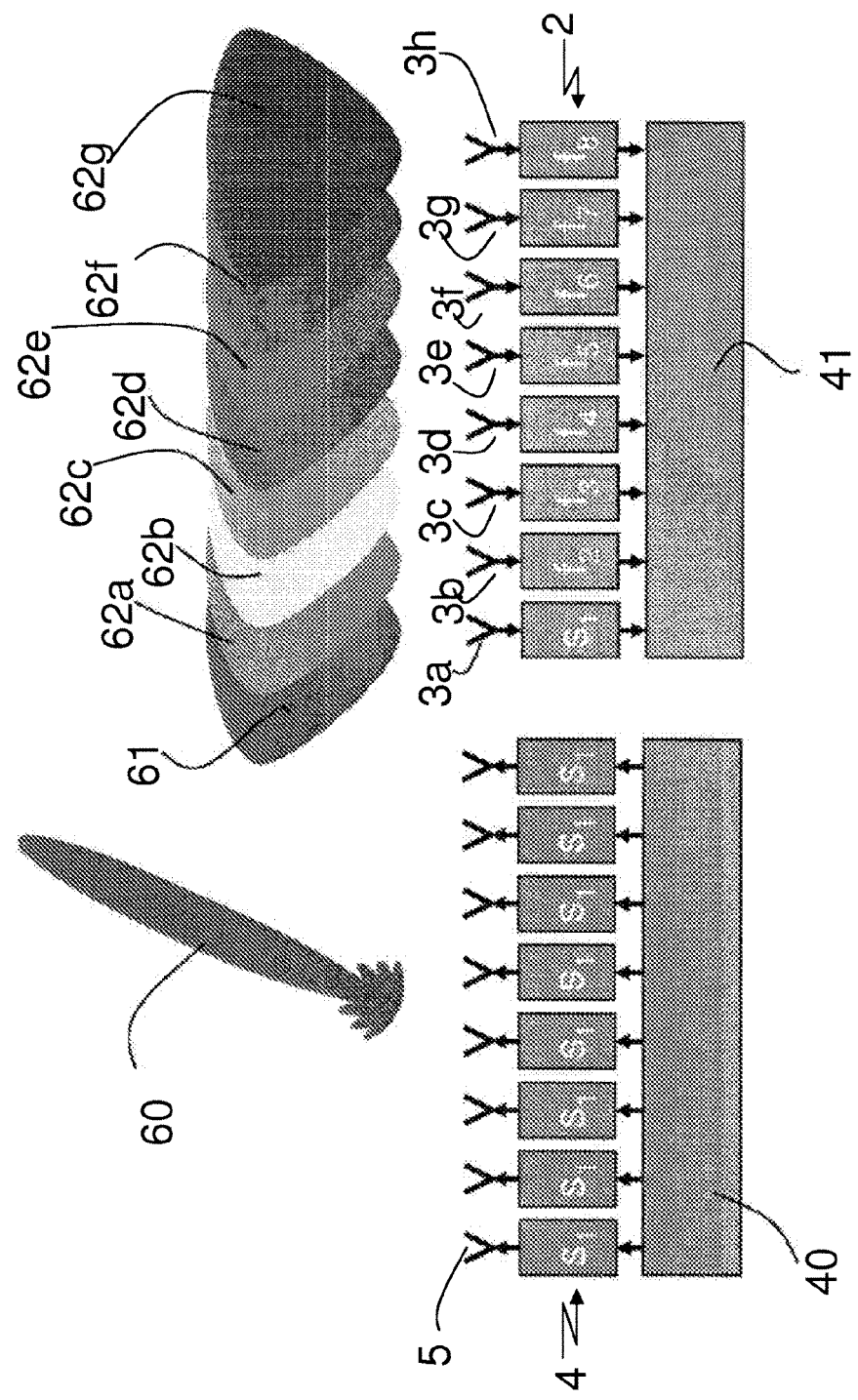
FIG. 10 shows a block scheme of the system of FIG. 3 in a first combined mode.
Figure 11:
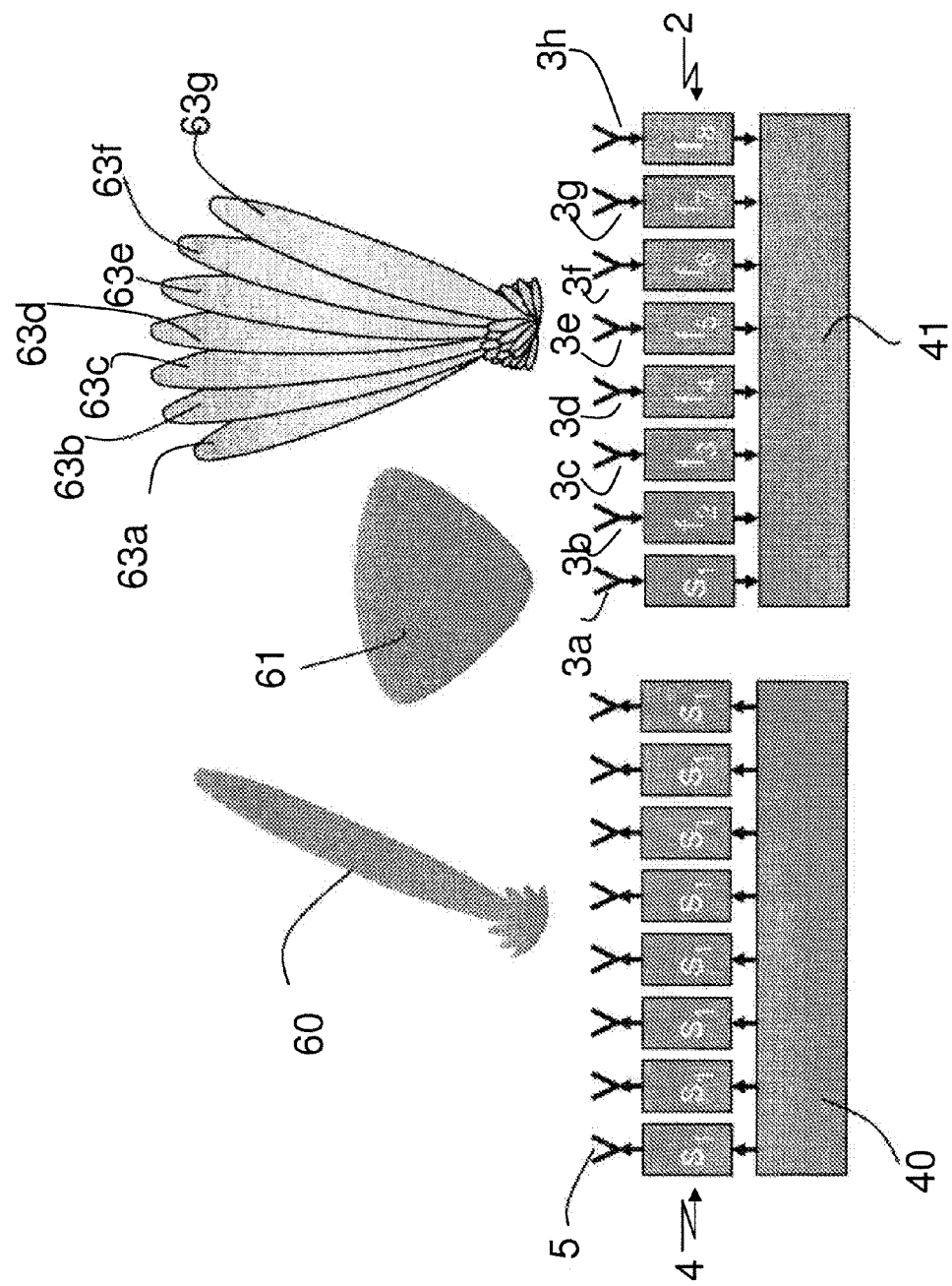
FIG. 11 shows a block scheme of the system of FIG. 3 in a second combined mode.

FIG. 10 shows a block scheme of the system 1 in a first combined mode wherein the system operates both as a radar and as a system for determining a propagation direction of a received electromagnetic wave. Here, a radar signal is transmitted in a beam 60 having a relatively narrow angular width and a specific orientation, wherein a particular receiving antenna element 3a is arranged for receiving a reflected radar signal in relatively broad beam 61. The further receiving antenna elements 3b-3h are arranged for determining a propagation direction of a received electromagnetic wave. In the first combined mode, each further antenna element 3b-3h is assigned to corresponding mutually different frequency bands as described referring to FIG. 6. In the second combined mode, shown in FIG. 11, the further receiving antenna elements 3b-3h have been tuned to a specific frequency band, so that angular information can be found.

The system 1 according to the invention can advantageously be used as a relatively compact, light and cheap device on a relatively compact platform. Applications range from surface surveillance, battlefield surveillance, compound security and traffic monitoring to collision avoidance systems and the arrays 2, 4 can be readily re-configured depending on the application or the changing needs of an application.

It is noted that the processing steps mentioned above can be performed either by dedicated hardware or by standard hardware that is loaded with software suitable for performing the data processing tasks.

The invention is not restricted to the embodiments described herein. It will be understood that many variants are possible.

In the shown embodiments of FIGS. 3-11, the number of transmitting antenna elements and the number of receiving antenna elements is eight. However, also other numbers of antenna elements can be used. In general, the width of a narrow beam can be reduced if the number of corresponding antenna elements increases, thus improving the angular resolution of the system.

Other such variants will be obvious for the person skilled in the art and are considered to lie within the scope of the invention as formulated in the following claims.

What is claimed is:

1. A system for determining a propagation direction of a received electromagnetic wave, the system comprising:
   a first linear phased array of transmitting antenna elements;
   a second linear phased array of receiving antenna elements, the second linear phased array of receiving antenna elements comprising a first receiving element and a plurality of other receiving elements;
   a processing unit for processing signals received by the second linear phased array of receiving antenna elements to generate receiving data corresponding to a set of respective angular synthetic receiving aperture beams;
   wherein the first and second linear phased arrays are configurable to enable the system to operate in a radar mode, an electronic warfare support measures (ESM) mode, or a combined radar/ESM mode, and wherein the system further comprises a multiple number of conditioning paths, each path including an amplifier, a bandpass filter and an analog-to-digital converter (ADC) for conditioning signals received from a corresponding receiving antenna element;
   wherein the processing unit is configured to determine a propagation direction of a received electromagnetic wave;
   wherein the processing unit is configured to cause the system to enter the combined radar/ESM mode by configuring the first array to transmit a radar signal in a first beam having first angular width, and configuring the second array to receive, at a first receiving antenna element, in a second beam a reflected radar signal, other than the received electromagnetic wave, wherein the second beam is broader than the first beam, and to determine using the processing unit and the plurality of other receiving antenna elements, the propagation direction of the received electromagnetic wave; and
   wherein each of the plurality of other receiving antenna elements is tuned to a specific frequency band.

2. A system as in claim 1, wherein the transmitted radar signal has a frequency modulated continuous waveform.

3. A system according to claim 2, further comprising a multiple number of second linear phased arrays of receiving antenna elements, the phased arrays having a mutually different orientation.

4. A system according to claim 1, further comprising a multiple number of second linear phased arrays of receiving antenna elements, the phased arrays having a mutually different orientation.

5. A method of determining a propagation direction of a received electromagnetic wave using a hardware platform comprising a first linear phased array of transmitting antenna elements and a second linear phased array of receiving antenna elements, the second linear phased array of receiving antenna elements comprising a first receiving element and a plurality of other receiving elements, the method comprising:
   transmitting a radar signal in a first beam having a first angular width, using the first linear phased array;
   receiving a reflected radar signal with the first receiving element of the second linear phased array, in a second beam wherein the second beam is broader than the first beam; and
   determining a propagation direction of a received electromagnetic wave, other than the reflected radar signal, using a processor unit and the plurality of other receiving antenna elements of the second linear phased array, wherein each of the plurality of other receiving antenna elements is tuned to a specific frequency band; and
   conditioning, in a multiple number of conditioning paths, signals received from receiving antenna elements, by amplifying, bandpass filtering, and analogue-digital converting signals received from a corresponding receiving antenna element.

6. A method as in claim 5, further comprising the step of configuring the hardware platform to operate in a radar mode, an electronic warfare support measures (ESM) mode, or a combined radar/ESM mode.

7. A non-transitory computer readable medium having instructions stored thereon which, when executed, cause a processing unit to perform operations of determining a propagation direction of a received electromagnetic wave, using a hardware platform comprising:
   a first linear phased array of transmitting antenna elements and a second linear phased array of receiving antenna elements comprising a first receiving element and a plurality of other receiving elements, the operations comprising:
   transmitting a radar signal in a first beam having a first angular width, using the first linear phased array;
   receiving a reflected radar signal with the first receiving element of the second linear phased array, in a second beam wherein the second beam is broader than the first beam;
   determining a propagation direction of a received electromagnetic wave, other than the reflected radar signal, using a processor unit and the plurality of other receiving antenna elements of the second linear phased array, wherein each of the plurality of other receiving antenna elements is tuned to a specific frequency band; and
   conditioning, in a multiple number of conditioning paths, signals received from receiving antenna elements, by amplifying, bandpass filtering, and analogue-digital converting signals received from a corresponding receiving antenna element.

8. A system for determining a propagation direction of a received electromagnetic wave, the system comprising:
   a first linear phased array of transmitting antenna elements;
   a second linear phased array of receiving antenna elements comprising a first receiving element and a plurality of other receiving elements; and
   a processing unit for processing signals received by the receiving antenna elements to generate receiving data corresponding to a set of respective angular synthetic receiving aperture beams, wherein:
   the first and second linear phased arrays are configurable to enable the system to operate in a radar mode, an electronic warfare support measures (ESM) mode, or a first combined radar/ESM mode or a second combined radar/ESM mode, and wherein the system further comprises a multiple number of conditioning paths, each path including an amplifier, a bandpass filter and an analog-to-digital converter (ADC) for conditioning signals received from a corresponding receiving antenna element;
   for operation in the first and second combined radar/ESM mode, the first array is configured to transmit a radar signal in a first beam having first angular width, and the second array is configured to receive, at the first receiving antenna element, in a second beam a reflected radar signal, wherein the second beam is broader than the first beam;
   the processing unit is configured to cause the system to enter the second combined radar/ESM mode by configuring the second array to determine the propagation direction of a received electromagnetic wave other than the reflected radar signal;

each receiving antenna element of the plurality of other receiving antenna elements is tuned to a specific frequency band; and for operation in the first combined radar/ESM mode, the second array is configured such that each of the plurality of other receiving antenna elements of the second array is assigned to mutually different frequency bands.

9. A method of determining a propagation direction of a received electromagnetic wave using a hardware platform comprising a first linear phased array of transmitting antenna elements and a second linear phased array of receiving antenna elements comprising a first receiving element and a plurality of other receiving elements, the method comprising:

transmitting a radar signal in a first beam having a first angular width, using the first linear phased array;

receiving a reflected radar signal with the first receiving element of the second linear phased array, in a second beam wherein the second beam is broader than the first beam;

determining a propagation direction of a received electromagnetic wave, other than the reflected radar signal, using the processor unit and the plurality of other receiving antenna elements of the second linear phased array, wherein, in a second combined radar/ESM mode, each of the other receiving antenna elements is tuned to a specific frequency band;

assigning, in a first combined radar/ESM mode, each of the plurality of other receiving antenna elements of the second array to mutually different frequency bands; and conditioning, in a multiple number of conditioning paths, signals received from receiving antenna elements, by amplifying, bandpass filtering, and analogue-digital converting signals received from a corresponding receiving antenna element.

10. A method according to claim 9, wherein in the first combined radar/ESM mode, each of the plurality of other receiving antenna elements of the second array is assigned to mutually different frequency bands, prior to tuning them to the specific frequency band defined in the determining step.

11. A non-transitory computer readable medium having instructions stored thereon which, when executed, cause a processing unit to perform a method of determining a propagation direction of a received electromagnetic wave, using a hardware platform comprising a first linear phased array of transmitting antenna elements and a second linear phased array of receiving antenna elements comprising a first receiving element and a plurality of other receiving antenna elements, the method comprising the steps of:

transmitting a radar signal in a first beam having a first angular width, using the first linear phased array;

receiving a reflected radar signal with the first receiving element of the second linear phased array, in a second beam wherein the second beam is broader than the first beam;

determining a propagation direction of a received electromagnetic wave, other than the reflected radar signal, using the processor unit and the plurality of other receiving antenna elements of the second linear phased array, wherein, in a second combined radar/ESM mode, each receiving element of the plurality of other receiving antenna elements is tuned to a specific frequency band;

assigning, in a first combined radar/ESM mode, each receiving antenna element of the plurality of other receiving antenna elements of the second array to mutually different frequency bands; and conditioning, in a multiple number of conditioning paths, signals received from receiving antenna elements, by amplifying, bandpass filtering, and analogue-digital converting signals received from a corresponding receiving antenna element.

* * * * *